Patented Jan. 6, 1942

2,269,272

UNITED STATES PATENT OFFICE 2,269,272

INSECTICIDE

Oswald Krefft, Hamburg, Germany, assignor to Chemical Marketing Company Inc., New York, N. Y.

No Drawing. Application March 11, 1940, Serial No. 323,385. In Germany March 3, 1939

6 Claims. (Cl. 167—33)

The present invention relates to the killing of all sorts of animals, especially insects, and the manner in which the same is to be performed. Such insecticides are well known. Nevertheless it is desirable that insecticides exert a prompt and preventive effect on the animals, or their forms of development; however without any detrimental effect on the plants to be protected, nor to have a poisonous effect on warm-blooded animals.

The present invention provides a means for killing insects and avoids the afore-mentioned disadvantages. The new process involves the use of N-heterocyclic compounds in combination with O-heterocyclic compounds. The N-heterocyclic compounds may be e. g.: all derivatives of the range of pyrrole and or the pyridine. Especially suitable for the purpose are the partially or completely hydrogenated derivatives of the mentioned heterocyclic compounds, as e. g. dihydropyrrole or further homologous or substitution products thereof, alone or in any mixture. Likewise suitable are such compounds, the formulae of which are represented by the condensation of benzene—or naphthalene—etc. nuclei with the afore-said N-heterocyclic compounds, e. g. carbazole, quinoline, acridine or hydrogenation- and/or substitution-products thereof. The other compounds which are essential for the present invention and which are to be used in combination with the N-heterocyclic compounds are O-heterocyclic compounds, as e. g. pyrone or condensation products thereof with aromatic nuclei and or substitution products of the heterocyclic compounds.

It is remarkable that the described N-heterocyclic compounds as well as the O-heterocyclic compounds per se are unable to exert a notable insecticide effect. The combination however of the described 2 groups of compounds show an excellent insecticide effect in each respect. In such respect it is of no importance to know if the combination according to the present invention is followed by the formation of saltlike compounds or the formation of compounds with residual affinitives, or if perhaps on the other hand the favourable effect consists of a biological combination effect.

According to the invention as O-heterocyclic compounds the following compounds may e. g. be mentioned: pyrone, coumarone, piperonal, furane, furfurol, silvane, or benzofurane.

The aforesaid compounds or groups of compounds may be brought into combination—according to my invention—in known manner by mixing eventually with the use of solvents. This mixing may also be done shortly before or during the use as insecticide.

Example 1

0.1 g. piperidine and 0.1 g. beta-dimethyl-benzo-di-(alpha-pyrone) are dissolved in 100 ccm. of water by slightly heating. This solution is finally diluted to 2000 ccm. This solution kills the larvae of the yellow-fever-mosquito within 12 hours up to 90% and in the use of 24 hours to 100%. Piperidine alone shows no effect even in the proportion of 1:2000. Likewise the sodium compound of beta-dimethyl-benzo-di-(alpha-pyrone) shows after the course of 48 hours only a killing effect of 50%.

Example 2

0.1 g. methylcyclopentenol-bis-benzotetronic acid are dissolved together with 0.05 g. dihydropyrrol and afterwards diluted to 2000 ccm. After 12 hours a killing effect of 100% was obtained.

Example 3

0.1 g. coumarine are dissolved in hot water and then diluted to 2000 ccm. Even after 72 hours no effect on the larvae of the yellow-fever-mosquito was obtained.

On the other hand 0.1 g. nicotinic acid was dissolved in 2200 ccm. water. This solution had a killing effect of only 25% even after 72 hours.

0.1 g. coumarine together with 0.1 g. nicotinic acid are dissolved in 100 ccm. of water and then diluted to 5000 ccm. The killing effect of this mixture according to my invention was 90% after 24 hours and 100% after 48 hours against the larvae of the yellow-fever-mosquito.

Example 4

1 g. o-coumaric acid and a small quantity of sodium carbonate are dissolved in 100 ccm. water and then diluted to 2000 ccm. The killing effect against the larvae of the yellow-fever-mosquito was 40% after 24 hours and 55% after 48 hours.

Example 5

1.75 g. piperidine are dissolved in 2000 ccm. water and the alkaline solution is neutralised with hydrochloride acid. The killing effect against the yellow-fever-mosquito was 0% after 24 hours, 10% after 48 hours, and 20% after 64 hours.

Example 6

1.64 g. o-coumaric acid and 1 g. piperidine are dissolved in 100 ccm. water and then diluted to 2000 ccm. The killing effect against the larvae of the yellow-fever-mosquito was 100% after 24 hours.

Example 7

Molar quantities of p-nitroacetanilide and chelidonic acid are melted and the product mixed with water. After filtration from a little quantity of a resinous residue the clear solution is cautiously evaporated on the water bath. 1 g. of this substance with 1 g. piperidine are dissolved in 100 ccm. water and then diluted to 10,000 ccm. The killing effect against the larvae of the yellow-fever-mosquito was 100% after 6 hours.

Example 8

1 g. of 95% rotenone is dissolved in water in the proportion of 1:10,000. The killing effect against the larvae of the yellow-fever-mosquito was 80% after 15 hours and 100% after 24 hours.

Like the above described dilutions the following combinations of compounds have a killing effect of 100% after 24 hours: nicotinic pyrrolidine; alpha-acetyl-benzotetronic-piperidine; alpha-acetyl-benzotetronic-piperidide - piperidine; chelidonic morpholine; 5-pyrazolone-3-carbonic-6-amino-coumarine; nicotinic-5-chlor-8-amido-coumarine; 3,6-dinitro-4-methyl-coumaric-morpholine; 6-nitrocoumaric-ethyl-morpholine; p-nitrobenzole - azo - alpha - acetylbenzotetronic-piperidine; propylene-bis-benzotetronic pyrrolidine; coumalinic piperidine; nitroso-piperidine in combination with 4-methyl-scopoletine.

By use of the single compounds the killing effect is considerably decreased.

The effect may be enhanced by the addition of unsaturated side-chains, nitro- and nitroso-compounds of the aromatic hydrocarbons or amines, derivatives of the trimethylene, e. g. caronic acid, five C-atom nuclei, e. g. methylcyclo-pentenolone and their substitution products.

The new insecticide compounds have no deleterious effect on the plants to be protected, nor any poisonous effect upon warm-blooded animals. The insecticide effect according to my invention is further enhanced by the fact that these new insecticides coat the plants superficially like a film. In such a way it is ensured that the insects come in contact with the insecticide.

I claim:

1. An insecticide comprising essentially a combination made of a N-heterocyclic compound having only slight insecticidal effect upon the larvae of the yellow fever mosquito selected from the group consisting of pyrolle derivatives, pyridine derivatives, carbazole, quinoline, acridine, hydrogenation products of the foregoing and substitution products of the foregoing and an O-heterocyclic compound having only slight insecticidal effect upon the larvae of the yellow fever mosquito selected from the group consisting of pyrone, condensation products thereof with aromatic nuclei and substitution products thereof, said combination being characterized by a greatly enhanced insecticidal effect on the larvae of the yellow fever mosquito as compared with that of either of said compounds.

2. An insecticide containing as the essential insecticide a combination made of a N-heterocyclic compound having only slight insecticidal effect upon the larvae of the yellow fever mosquito and an O-heterocyclic compound having only slight insecticidal effect upon the larvae of the yellow fever mosquito, said combination being selected from the group of combinations consisting of alpha - acetyle - benzotetronic - piperidine; alpha - acetyl - benzotetronic - piperidide - piperidine; chelidonic morpholine; 5-pyrazolone-3 - carbonic - 6 - amino - coumarine; nicotinic-5-chlor-8-amide-coumarine; 3,6-dinitro-4-methyl-coumaric-morpholine; 6 - nitrocoumaric - ethyl-morpholine; p - nitrobenzole - azo-alpha-acetyl-benzotetronic piperidine; propylene-bis-benzotetronic pyrrolidine; coumalinic piperidine; nitroso-piperidine in combination with 4-methyl-skopoletine, piperidine-beta-dimethyl-benzo-di-(alpha) pyrone, methyl cyclopentenol-bis-benzotetronic acid-dihydropyrrole, nicotinic acid-coumarine, ortho-coumaric acid-piperidine and chelidonic acid-paranitroacetanilide, said insecticide having a killing effect of 100% at 24 hours against the larvae of the yellow fever mosquito when employed in dilutions not stronger than about 1:760.

3. An insecticide comprising essentially a solution of at least one N-heterocyclic compound having only slight insecticidal effect upon the larvae of the yellow fever mosquito and selected from the group consisting of pyrrole derivatives, pyridine derivatives, carbazole, quinoline, acridine, hydrogenation products of the foregoing and substitution products of the foregoing and an O-heterocyclic compound having only slight insecticidal effect upon the larvae of the yellow fever mosquito selected from the group consisting of pyrone, condensation products thereof with aromatic nuclei and substitution products thereof, said solution being characterized by a greatly enhanced insecticidal effect upon the larvae of the yellow fever mosquito as compared with that of a solution containing solely any one of said compounds.

4. A process for killing insects which comprises covering plants to be protected with a combination of N-heterocyclic compound having only slight insecticidal effect upon the larvae of the yellow fever mosquito and an O-heterocyclic compound having only slight insecticidal effect upon larvae of the yellow fever mosquito, said combination being selected from the group consisting of alpha-acetyl-benzotetronic-piperidine; alpha-acetyl - benzotetronic - piperidide - piperidine; chelidonic morpholine; 5-pyrazolone-3-carbonic-6-amino-coumarine; nicotinic-5-chlor-8 - amido - coumarine; 3,6-dinitro-4-methyl-coumaric-morpholine; 6-nitrocoumaric-ethyl-morpholine; p-nitrobenzole-azo-alpha-acetylbenzotetronic piperidine; propylene-bis-benzotetronic pyrrolidine; coumalinic piperidine; nitroso-piperidine in combination with 4-methyl-skopoletine, piperidine-beta-dimenthyl-benzo-di-(alpha) pyrone, methyl cyclopentenol-bis-benzotetronic acid-dihydropyrrole, nicotinic acid-coumarine, ortho-coumaric acid-piperidine and chelidonic acid-para-nitroacetanilide, said combination being characterized by a greatly enhanced insecticidal effect upon the larvae of the yellow fever mosquito as compared with that of either of the heterocyclic compounds comprising said combination.

5. A process for killing insects which comprises covering plants to be protected with a combination of a N-heterocyclic compound having only slight insecticidal effect upon the larvae of the yellow fever mosquito and selected from the group consisting of pyrrole derivatives, pyridine derivatives, carbazole, quinoline, acridine, hydrogenation products of the foregoing and substitution products of the foregoing and an O-heterocyclic compound having only slight insecticidal effect upon the larvae of the yellow fever mosquito selected from the group consisting of pyrone, condensation products thereof with aromatic nuclei and substitution products thereof, said combination being characterized by the acidic properties of one of the heterocyclic compounds of the combination and by a greatly enhanced insecticidal effect upon the larvae of the yellow fever mosquito as compared with that of any of the individual heterocyclic compounds.

6. A process for killing insects which comprises applying to the outer surfaces of plants to be protected from said insects a solution containing at least one N-heterocyclic compound having only slight insecticidal effect upon the larvae of the yellow fever mosquito and selected from the group consisting of pyrrole derivatives, pyridine derivatives, carbazole, quinoline, acridine, hydrogenation products of the foregoing and substitution products of the foregoing, and applying to the outer surfaces of said plants a solution containing at least one O-heterocyclic compound having only slight insecticidal effect upon the larvae of the yellow fever mosquito and selected from the group consisting of pyrone, condensation products thereof with aromatic nuclei and substitution products thereof, whereby a greatly enhanced insecticidal effect upon the larvae of the yellow fever mosquito as compared with that of a solution of any one of said heterocyclic compounds is provided.

OSWALD KREFFT.